United States Patent
Walmsley et al.

(10) Patent No.: US 7,477,987 B2
(45) Date of Patent: Jan. 13, 2009

(54) METHOD FOR PERFORMING GAMES

(75) Inventors: Simon Robert Walmsley, Balmain (AU); Paul Lapstun, Balmain (AU); Jacqueline Anne Lapstun, Balmain (AU); Kia Silverbrook, Balmain, New South Wales (AU)

(73) Assignee: Silverbrook Research Pty Ltd, Balmain (AU)

( * ) Notice: Subject to any disclaimer, the term of this patent is extended or adjusted under 35 U.S.C. 154(b) by 406 days.

(21) Appl. No.: 11/154,676

(22) Filed: Jun. 17, 2005

(65) Prior Publication Data

US 2005/0233809 A1    Oct. 20, 2005

Related U.S. Application Data

(63) Continuation of application No. 11/006,536, filed on Dec. 8, 2004, now Pat. No. 7,295,922, which is a continuation of application No. 09/693,705, filed on Oct. 20, 2000, now Pat. No. 6,847,883.

(30) Foreign Application Priority Data

Oct. 25, 1999    (AU) .................................... PQ3632

(51) Int. Cl.
*G01C 21/30* (2006.01)
*G01C 21/32* (2006.01)

(52) U.S. Cl. .................. 701/208; 701/200; 463/37; 345/175

(58) Field of Classification Search ................ 701/208, 701/200; 345/175, 180, 166, 162, 163, 170, 345/173; 250/221, 216; 463/37; 235/454

See application file for complete search history.

(56) References Cited

U.S. PATENT DOCUMENTS

| | | | |
|---|---|---|---|
| 4,420,682 A | 12/1983 | Huber | |
| 4,445,028 A | 4/1984 | Huber | |
| 4,814,553 A * | 3/1989 | Joyce | ...................... 178/18.01 |
| 4,864,618 A | 9/1989 | Wright et al. | |
| 5,051,736 A | 9/1991 | Bennett et al. | |
| 5,214,757 A | 5/1993 | Mauney et al. | |
| 5,424,756 A * | 6/1995 | Ho et al. | ...................... 345/158 |
| 5,455,952 A * | 10/1995 | Gjovaag | ...................... 717/108 |

(Continued)

FOREIGN PATENT DOCUMENTS

AU    9724543 A * 11/1997

(Continued)

OTHER PUBLICATIONS

Automatic on-line signature verification, Nalwa, V.S.; Proceedings of the IEEE, vol. 85, Issue 2, Feb. 1997 pp. 215-239, Digital Object Identifier 10.1109/5.554220.*

(Continued)

*Primary Examiner*—Cuong H Nguyen

(57) ABSTRACT

A method for carrying out a game of the type comprising the steps of noting written information on a surface with the aid of a writing means. The surface is provided with a position-coding pattern and the writing means is a combined writing and reading unit, which continually reads its movement across the surface. The information is converted into transmittable data and is sent via a communication system to a recipient which returns feedback on the received information.

8 Claims, 15 Drawing Sheets

U.S. PATENT DOCUMENTS

| | | | |
|---|---|---|---|
| 5,477,012 A | | 12/1995 | Sekendur |
| 5,633,993 A | * | 5/1997 | Redmann et al. ............ 345/419 |
| 5,652,412 A | | 7/1997 | Lazzouni et al. |
| 5,661,506 A | * | 8/1997 | Lazzouni et al. ............ 345/179 |
| 5,686,705 A | | 11/1997 | Conroy et al. |
| 5,692,073 A | | 11/1997 | Cass |
| 5,694,549 A | | 12/1997 | Carlin et al. |
| 5,749,735 A | | 5/1998 | Redford et al. |
| 5,751,576 A | | 5/1998 | Monson |
| 5,771,310 A | * | 6/1998 | Vannah ...................... 382/154 |
| 5,781,195 A | * | 7/1998 | Marvin ...................... 345/428 |
| 5,830,529 A | * | 11/1998 | Ross .......................... 427/152 |
| 5,845,073 A | | 12/1998 | Carlin et al. |
| 5,852,434 A | | 12/1998 | Sekendur |
| 5,870,559 A | | 2/1999 | Leshem et al. |
| 5,877,458 A | | 3/1999 | Flowers |
| 5,896,403 A | * | 4/1999 | Nagasaki et al. ............ 714/752 |
| 5,900,943 A | * | 5/1999 | Owen ........................ 356/406 |
| 5,926,168 A | * | 7/1999 | Fan ............................ 345/158 |
| 5,945,985 A | | 8/1999 | Babin et al. |
| 5,948,040 A | * | 9/1999 | DeLorme et al. ............ 701/201 |
| 5,958,008 A | | 9/1999 | Pogrebisky et al. |
| 5,974,572 A | | 10/1999 | Weinberg et al. |
| 6,015,344 A | * | 1/2000 | Kelly et al. .................. 463/16 |
| 6,052,117 A | * | 4/2000 | Ohara et al. ................ 345/173 |
| 6,052,813 A | * | 4/2000 | Nagasaki et al. ............ 714/752 |
| 6,058,498 A | * | 5/2000 | Nagasaki et al. ............ 714/752 |
| 6,076,734 A | | 6/2000 | Dougherty et al. |
| 6,092,076 A | | 7/2000 | McDonough et al. |
| 6,119,152 A | | 9/2000 | Carlin et al. |
| 6,137,675 A | * | 10/2000 | Perkins ...................... 361/679 |
| 6,144,962 A | | 11/2000 | Weinberg et al. |
| 6,201,889 B1 | * | 3/2001 | Vannah ...................... 382/131 |
| 6,249,241 B1 | * | 6/2001 | Jordan et al. ................ 342/41 |
| 6,251,620 B1 | * | 6/2001 | Hatada et al. ................ 435/15 |
| 6,295,052 B1 | * | 9/2001 | Kato et al. .................. 345/179 |
| 6,303,924 B1 | * | 10/2001 | Adan et al. ................ 250/221 |
| 6,307,573 B1 | | 10/2001 | Barros |
| 6,341,310 B1 | | 1/2002 | Leshem et al. |
| 6,388,688 B1 | | 5/2002 | Schileru-Key |
| 6,400,690 B1 | | 6/2002 | Liu et al. |
| 6,470,383 B1 | | 10/2002 | Leshem et al. |
| 6,473,794 B1 | | 10/2002 | Guheen et al. |
| 6,477,531 B1 | | 11/2002 | Sullivan et al. |
| 6,490,652 B1 | * | 12/2002 | Van Hook et al. ........... 711/118 |
| 6,519,571 B1 | | 2/2003 | Guheen et al. |
| 6,536,037 B1 | | 3/2003 | Guheen et al. |
| 6,549,210 B1 | * | 4/2003 | Van Hook et al. ........... 345/561 |
| 6,571,171 B1 | | 5/2003 | Pauly |
| 6,615,166 B1 | | 9/2003 | Guheen et al. |
| 6,647,145 B1 | * | 11/2003 | Gay .......................... 382/187 |
| 6,721,713 B1 | | 4/2004 | Guheen et al. |
| 6,847,883 B1 | | 1/2005 | Walmsley et al. |
| 6,957,186 B1 | | 10/2005 | Guheen et al. |
| 6,964,374 B1 | | 11/2005 | Djuknic et al. |
| 6,999,990 B1 | | 2/2006 | Sullivan et al. |
| 7,334,735 B1 | * | 2/2008 | Antebi et al. ............... 235/492 |
| 2005/0086585 A1 | | 4/2005 | Robert et al. |
| 2005/0233809 A1 | * | 10/2005 | Walmsley et al. ............. 463/37 |
| 2007/0055441 A1 | * | 3/2007 | Retterath et al. ............ 701/200 |
| 2007/0064263 A1 | * | 3/2007 | Silverbrook et al. ........ 358/1.15 |
| 2007/0070066 A1 | * | 3/2007 | Bakhash ..................... 345/419 |
| 2007/0118430 A1 | * | 5/2007 | Wiseman et al. .............. 705/26 |

FOREIGN PATENT DOCUMENTS

| | | | |
|---|---|---|---|
| EP | 0294397 B2 | | 3/2007 |
| EP | 294397 B2 | * | 3/2007 |
| GB | 2306669 A | | 5/1997 |
| JP | 10-333863 | | 12/1998 |
| WO | WO 88/01818 A | | 3/1988 |
| WO | WO 8801818 A | * | 3/1988 |
| WO | WO 97/40468 A1 | | 10/1997 |
| WO | WO 9740468 A1 | * | 10/1997 |
| WO | WO 99/18487 A2 | | 4/1999 |
| WO | WO 99/19823 A | | 4/1999 |
| WO | WO 99/39277 A | | 8/1999 |
| WO | WO 99/50736 | | 10/1999 |
| WO | WO 99/50787 A1 | | 10/1999 |

OTHER PUBLICATIONS

Navigating and interacting indoors with a mobile learning game, Schwabe, G.; Goth, C.; Wireless and Mobile Technologies in Education, 2005. WMTE 2005. IEEE International Workshop on, Nov. 28-30, 2005 Page(s):8 pp., Digital Object Identifier 10.1109/WMTE.2005.47.*

Operation-style answering in multimedia testing system DrilLs-M for Kanji letter shape learning, Kinugasa, Y.; Yamashita, N.; Hayashi, T.; Tominaga, H.; Yamasaki, T.; Advanced Learning Technologies, 2005. ICALT 2005. Fifth IEEE International Conference on, Jul. 5-8, 2005 pp. 647-649, Digital Object Identifier 10.1109/ICALT.2005.216.*

Interactive cloth simulation in virtual environments, Keckeisen, M.; Stoev, S.L.; Feurer, M.; Strasser, W.; Virtual Reality, 2003. Proceedings. IEEE, Mar. 22-26, 2003 pp. 71-78, Digital Object Identifier 10.1109/VR.2003.1191123.*

M. Baur et al., A colaborative wearable system with remote sensing, Digest of Papers in Wearable Combuters, Oct. 19-20, 1998, INSPEC Accession No. 6097128.*

A. Smailagic et al., Application design for wearable and context-aware combputers, IEEE Pervasive Computing, pp. 20-29, vol. 1 issue 4, Oct.-Dec. 2002.*

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, p. 392-406.

Baur, M et al., 'A collaborative wearable system with remote sensing', Digest of Papers in Wearable Computers, Oct. 19-20, 1998, INSPEC Accession No. 6097128.

Smailagic, A et al., 'Application design for wearable and context-aware computers', IEEE Pervasive Computing, pp. 20-29, vol. 1, Issue 4, Oct.-Dec. 2002.

* cited by examiner

FIXED INFORMATION ▲~ 994

VARIABLE INFORMATION ~ 995

COMMAND BUTTON ~ 996

INPUT FIELD ~ 997

● DRAGGABLE COMMAND ~ 998

| LOCATION | INFORMATION | PAGE 1 OF 1 |

SELECTED LOCATION: COUNTRY / REGION / CITY NAME

YOU CLICKED ON: LATITUDE  LONGITUDE

COUNTRY / REGION / CITY INFORMATION

523

PRINT MAP

FIG. 14

METHOD FOR PERFORMING GAMES

CROSS REFERENCE TO RELATED APPLICATION

This is a Continuation of Ser. No. 11/006,536 filed Dec. 8, 2004 which is a Continuation of Ser. No. 09/693,705 filed Oct. 20, 2000 now issued U.S. Pat. No. 6,847,883, which is herein incorporated by reference.

FIELD OF INVENTION

The present invention relates to navigation of interactive printed maps and globes.

CO-PENDING APPLICATIONS

Various methods, systems and apparatus relating to the present invention are disclosed in the following co-pending applications/granted patents filed by the applicant or assignee of the present invention on Oct. 20, 2000:

| | | | | | |
|---|---|---|---|---|---|
| 09/693415 | 09/693219 | 6813558 | 09/693515 | 6847883 | 09/693647 |
| 09/693690 | 09/693301 | 6474888 | 6627870 | 6724374 | 09/673514 |
| 6454482 | 6808330 | 6527365 | 6474773 | 6550997 | |

The disclosures of these co-pending applications are incorporated herein by cross-reference.

Various methods, systems and apparatus relating to the present invention are disclosed in the following co-pending applications/granted patents filed by the applicant or assignee of the present invention on Sep. 15, 2000:

| | | | |
|---|---|---|---|
| 6679420 | 6963845 | 6995859 | 6720985 |

The disclosures of these co-pending applications are incorporated herein by reference.

Various methods, systems and apparatus relating to the present invention are disclosed in the following co-pending applications/granted patents filed by the applicant or assignee of the present invention on Jun. 30, 2000:

| | | | | | |
|---|---|---|---|---|---|
| 6824044 | 6678499 | 6976220 | 6976035 | 6766942 | 7286113 |
| 6922779 | 6978019 | 09/607843 | 6959298 | 6973450 | 7150404 |
| 6965882 | 7233924 | 7007851 | 6957921 | 6457883 | 6831682 |
| 6977751 | 6398332 | 6394573 | 6622923 | | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | | | |
|---|---|---|---|---|---|
| 6428133 | 6526658 | 6315399 | 6338548 | 6540319 | 6328431 |
| 6328425 | 6991320 | 6383833 | 6464332 | 6390591 | 7018016 |
| 6328417 | 09/575197 | 7079712 | 6825945 | 09/575165 | 6813039 |
| 6987506 | 7038797 | 6980318 | 6816274 | 7102772 | 09/575186 |

-continued

| | | | | | |
|---|---|---|---|---|---|
| 6681045 | 6728000 | 7172722 | 7088459 | 09/575181 | 7068382 |
| 7062651 | 6789194 | 6789191 | 6644642 | 6502614 | 6622999 |
| 6669385 | 6549935 | 6987573 | 6727996 | 6591884 | 6439706 |
| 6760119 | 7295332 | 6290349 | 6428155 | 6785016 | 6870966 |
| 6822639 | 6737591 | 7055739 | 7233320 | 6830196 | 6832717 |
| 6957768 | 09/575172 | 7170499 | 7106888 | 7123239 | 6409323 |
| 6281912 | 6604810 | 6318920 | 6488422 | 6795215 | 7154638 |
| 6859289 | | | | | |

The disclosures of these co-pending applications are incorporated herein by cross-reference.

BACKGROUND

Maps and globes provide a particularly intuitive basis for navigating geographic information. Maps displayed on a computer screen may support interactive navigation and geographic queries, but may suffer from the limited size and lack of resolution of the computer screen. Printed maps, while providing superior map detail, may suffer from a lack of interactivity.

SUMMARY OF INVENTION

It is an objective of the present invention to provide a new method and system for navigating a map or globe.

The present invention provides, in a first aspect, a method of enabling a user to designate, in a computer system, at least one geographic location, the method including the steps of:

printing a map of a geographic area, the geographic area including the at least one geographic location, the map including coded data indicative of an identity of the map and of a plurality of reference points of the map;

receiving, in the computer system, indicating data from a sensing device operated by the user, the indicating data regarding the identity of the map and a position of the sensing device relative to the map, the sensing device, when placed in an operative position relative to the map, sensing the indicating data using at least some of the coded data; and identifying, in the computer system and from the indicating data, the at least one geographic location.

Preferably the method includes the further steps of:

receiving, in the computer system, movement data regarding movement of the sensing device relative to the map, the sensing device sensing its movement relative to the map using at least some of the coded data; and identifying, in the computer system and from the movement data, a geographic region.

Preferably, the map contains at least one of the following categories of map information:

(a) geographic features of the geographic area;

(b) cities in the geographic area;

(c) countries related to the geographic area;

(d) different views of the geographic area;

(e) topography of the geographic area;

(f) vegetation of the geographic area;

(g) average rainfall for the geographic area;

(h) seasonal temperatures for the geographic area; and (i) population for the geographical area.

Preferably, the method includes the further step of printing at least one map control, and, when the map control is designated by the user using the sensing device, performing, in the computer system, an action associated with the map control.

The action may be one of:

(a) printing information about a designated country, region, city or other geographic location or geographic area;

(b) printing a map of a designated geographic region;

(c) printing a distance between designated geographic locations;

(d) printing a map of a geographic area adjoining a particular geographic area; and (f) printing a scaled-up or scaled-down map of a particular geographic area.

The present invention provides, in a second aspect, a system for enabling a user to designate, in a computer system, at least one geographic location, the system including:

a map of a geographic area, the geographic area including the at least one geographic location, the map including coded data indicative of an identity of the map and of a plurality of reference points of the map;

a printer for printing the map, including the coded data, on demand; and a computer system for receiving indicating data from a sensing device operated by the user, the indicating data regarding the identity of the map and a position of the sensing device relative to the map, the sensing device, when placed in an operative position relative to the map, sensing the indicating data using at least some of the coded data;

wherein the computer system is configured to identify, from the indicating data, the at least one geographic location.

Preferably, the system includes the sensing device, the sensing device senses its movement relative to the map using at least some of the coded data, and the computer system is configured to identify, from the movement, a geographic region.

Preferably the map contains at least one of the following categories of map information:

(a) geographic features of the geographic area;

(b) cities in the geographic area;

(c) countries related to the geographic area;

(d) different views of the geographic area;

(e) topography of the geographic area;

(f) vegetation of the geographic area;

(g) average rainfall for the geographic area;

(h) seasonal temperatures for the geographic area; and (i) population for the geographical area.

Preferably, the system includes a map control page including at least one printed map control, and the computer system is configured to perform an action associated with the map control when the map control is designated by the user using the sensing device.

The action may be one of:

(a) printing information about a designated country, region, city or other geographic location or geographic area;

(b) printing a map of a designated geographic area;

(c) printing a distance between designated geographic locations;

(d) printing a map of a geographic area adjoining a particular geographic area; and (f) printing a scaled-up or scaled-down map of a particular geographic area.

The present invention provides, in a third aspect, a system for enabling a user to designate, in a computer system, at least one geographic location, the system including:

a globe, the globe including coded data indicative of a plurality of reference points of the globe;

a computer system for receiving indicating data from a sensing device operated by the user, the indicating data regarding a position of the sensing device relative to the surface of the globe, the sensing device, when placed in an operative position relative to the surface of the globe, sensing the indicating data using at least some of the coded data;

wherein the computer system is configured to identify, from the indicating data, the at least one geographic location.

Preferably, the system includes the sensing device, the sensing device senses its movement relative to the globe using at least some of the coded data, and the computer system is configured to identify, from the movement, a geographic region.

BRIEF DESCRIPTION OF DRAWINGS

Preferred and other embodiments of the invention will now be described, by way of non-limiting example only, with reference to the accompanying drawings, in which:

FIG. 5d is a plan view showing the interleaving and rotation of the symbols of the four codewords of the tag shown in FIG. 5a;

FIG. 14 is a schematic view of an information page; and

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. Nos. 09/575,129, 09/575,174, 09/575,155, 09/575,195 and 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

Figure 1:
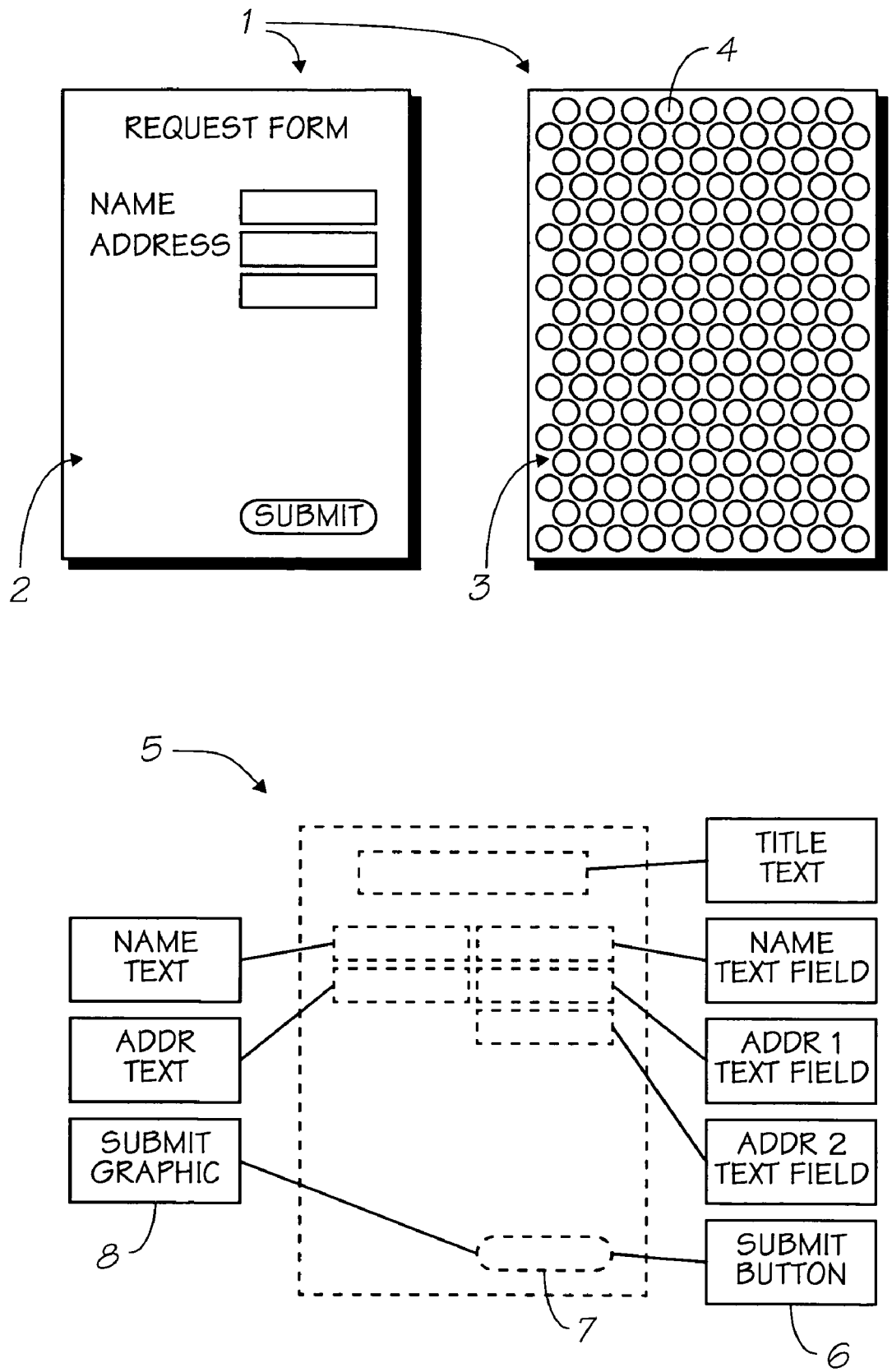
FIG. 1 is a schematic of a relationship between a sample printed netpage and its online page description.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The graphic data 2 and the coded data 3 are printed substantially simultaneously. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
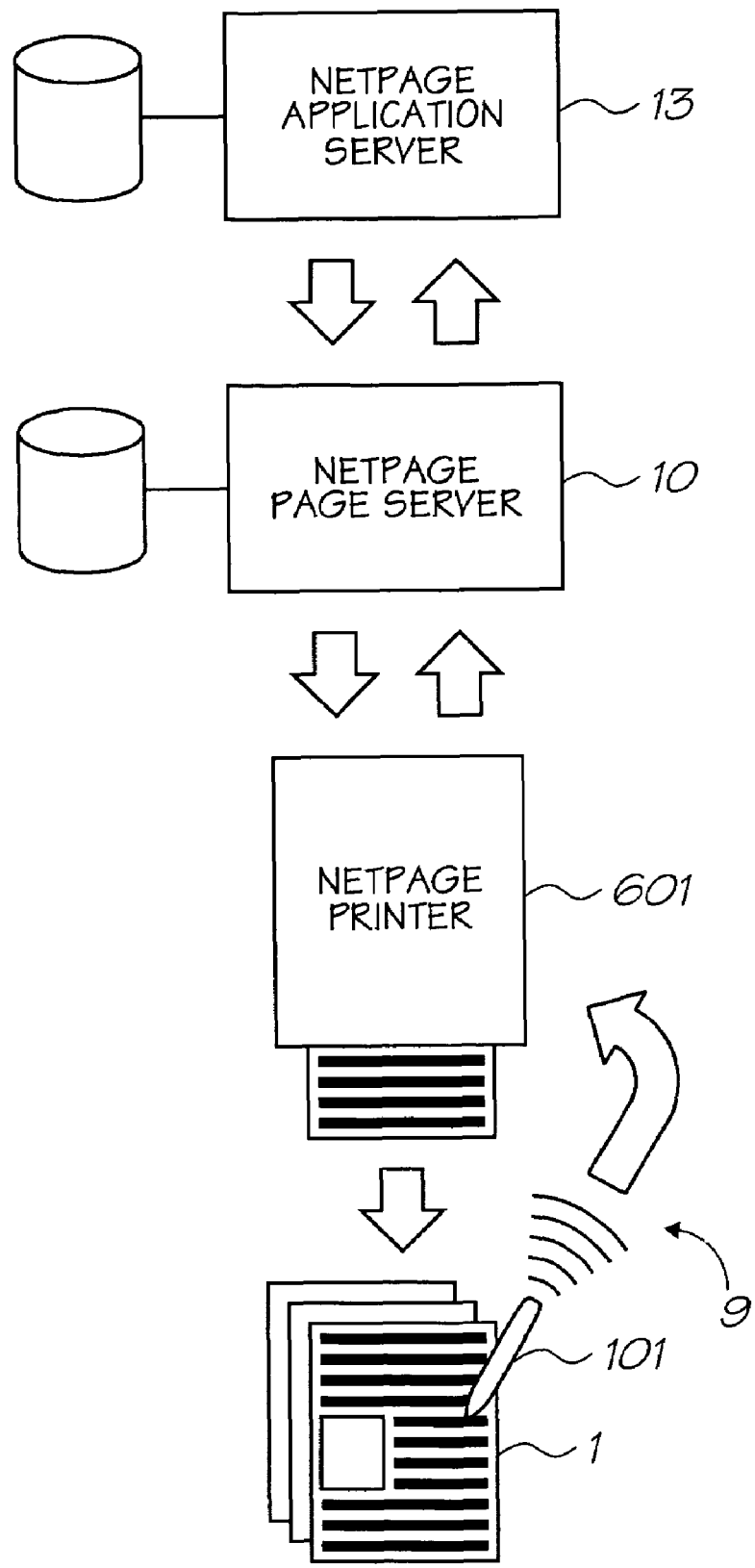
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier granted patent U.S. Pat. No. 6,727, 996 and our co-filed pending application U.S. Ser. No. 09/693,514, is able to deliver, periodically or on demand, personalized newspapers, magazines, catalogs, brochures and other publications, all printed at high quality as interactive netpages. This printer 601 simultaneously prints cyan, magenta, yellow, black, and infrared inks as well as paper conditioner and ink fixative. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our earlier application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
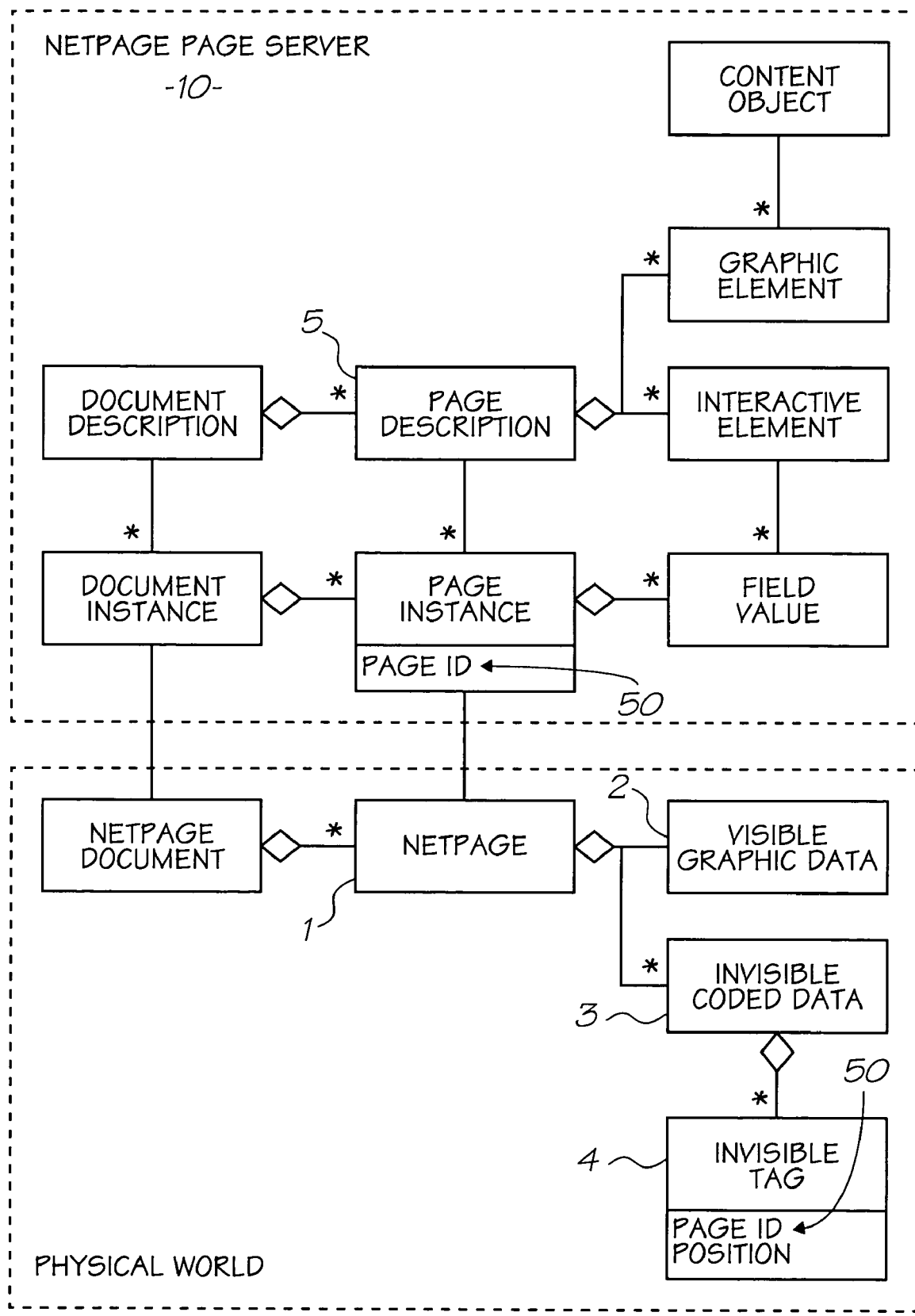
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code.

Figure 4A:
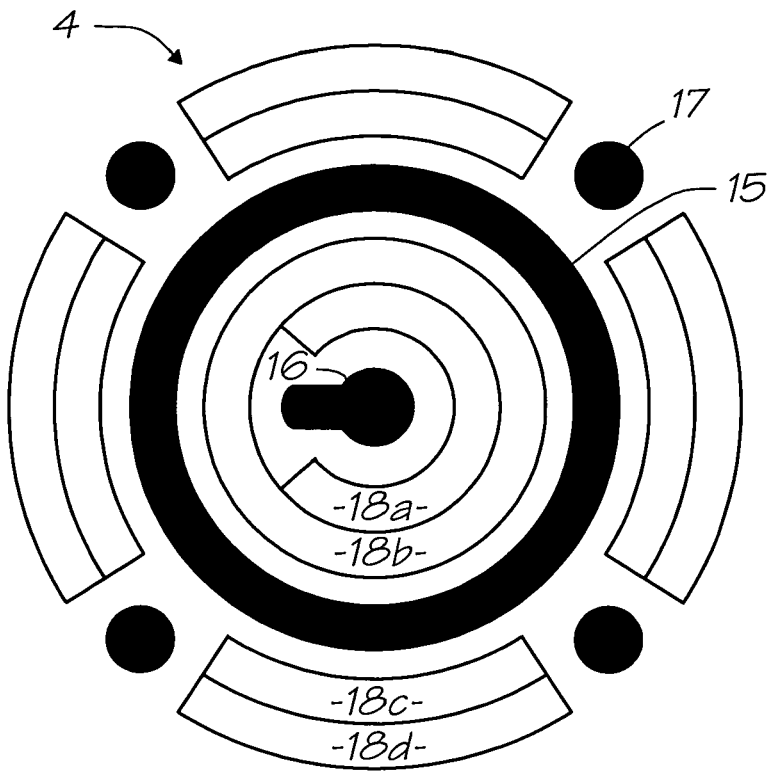
FIG. 4a is a plan view showing a structure of a netpage tag.

One embodiment of the physical representation of the tag, shown in FIG. 4a and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
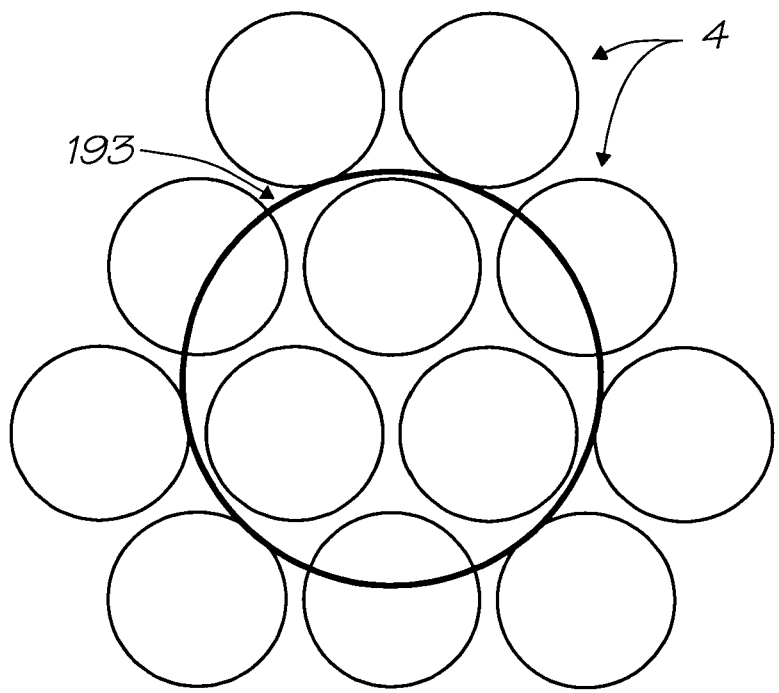
FIG. 4b is a plan view showing a relationship between a set of the tags shown in FIG. 4a and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
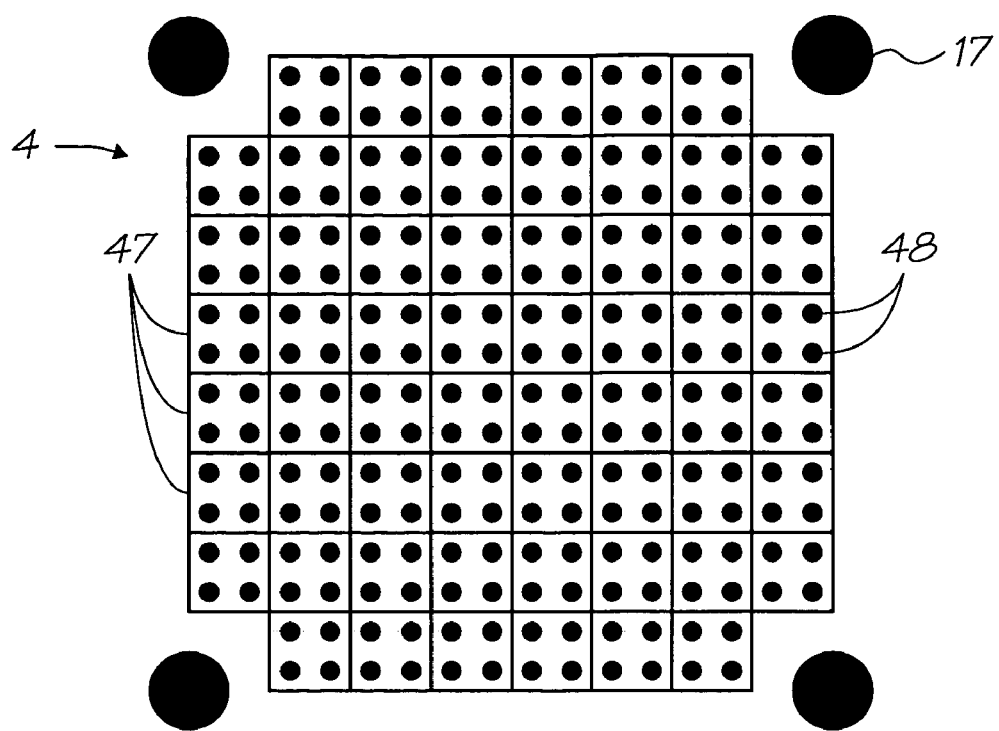
FIG. 5a is a plan view showing an alternative structure of a netpage tag.
Figure 5B:
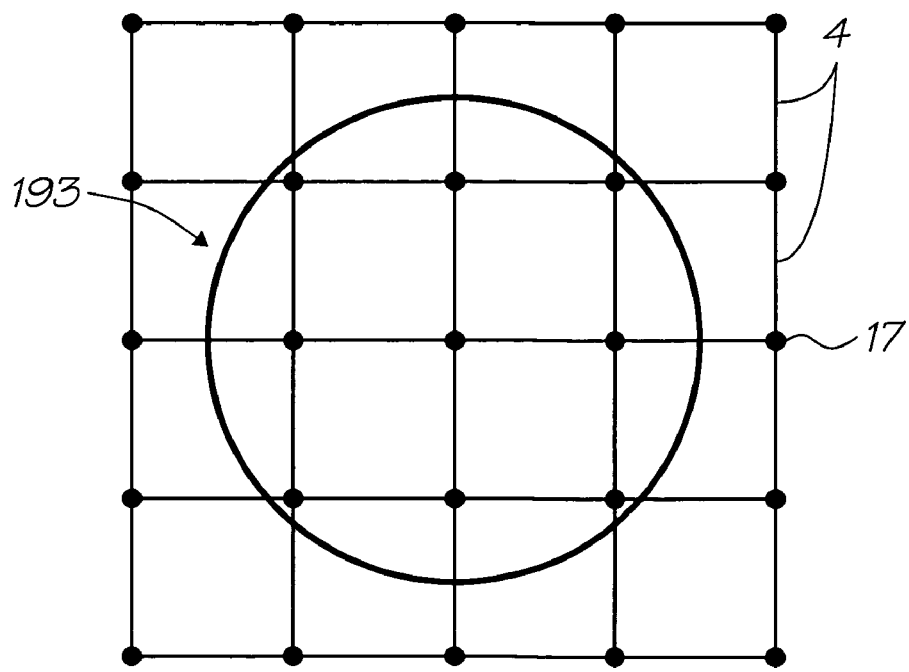
FIG. 5b is a plan view showing a relationship between a set of the tags shown in FIG. 5a and a field of view of a netpage sensing device in the form of a netpage pen.
Figure 5C:
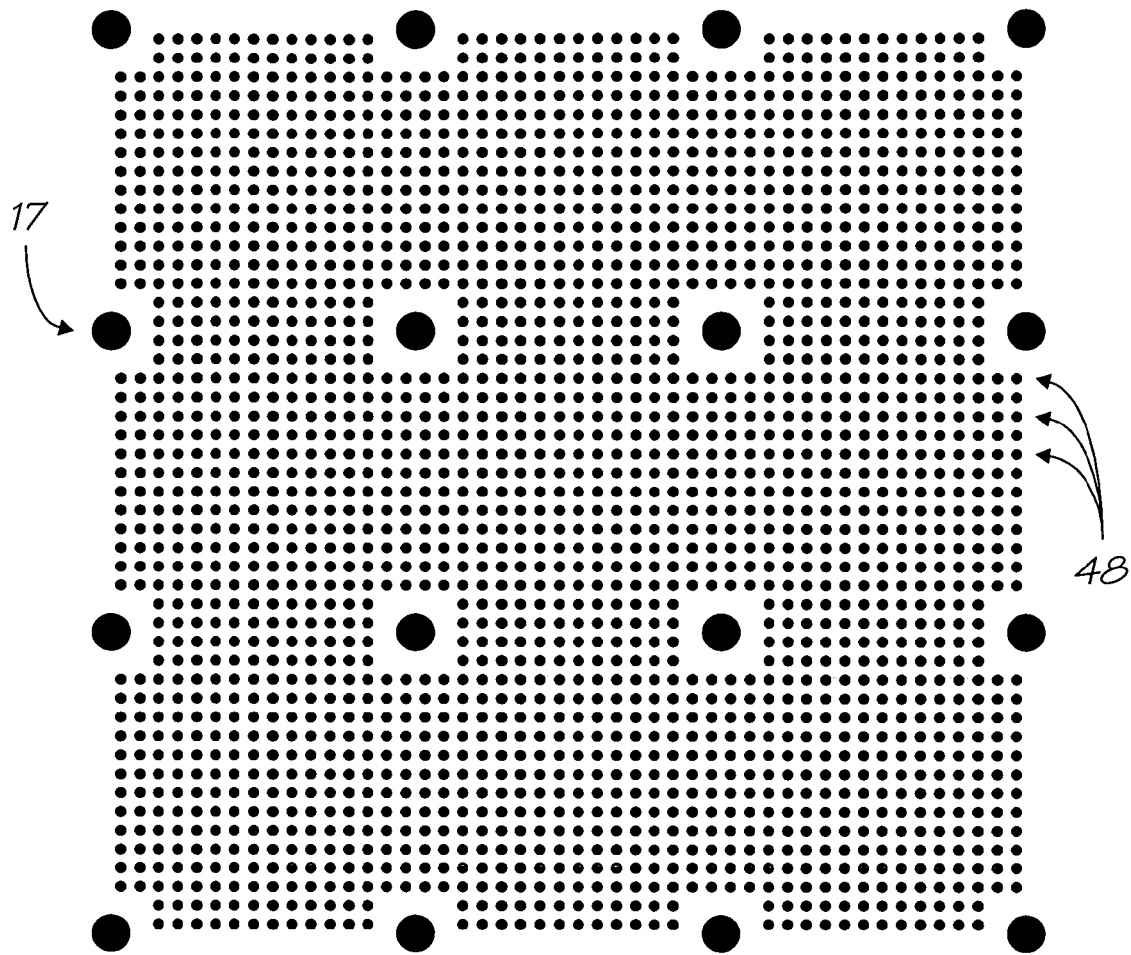
FIG. 5c is a plan view showing an arrangement of nine of the tags shown in FIG. 5a where targets are shared between adjacent tags.

An alternative tag structure more suited to a regular tiling is shown in FIG. 5a. The tag 4 is square and has four perspective targets 17. It is similar in structure to tags described by Bennett et al. in U.S. Pat. No. 5,051,736. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Figure 5D:
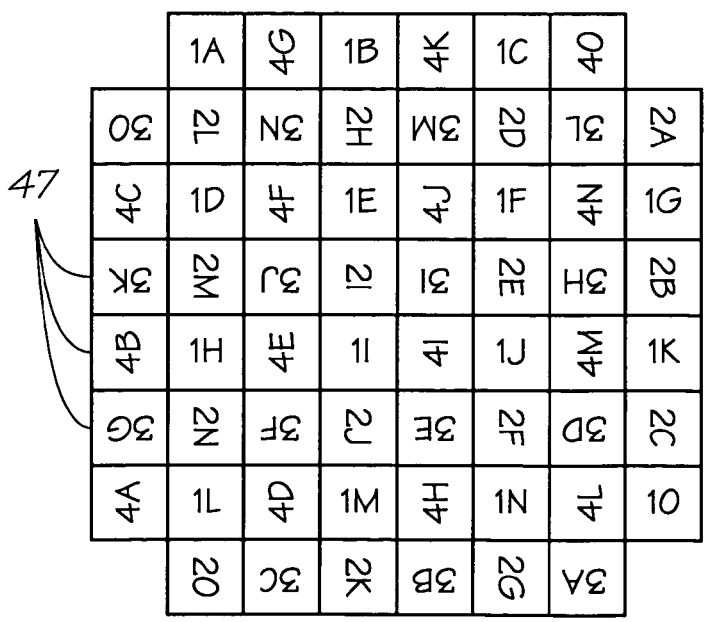

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575, 174.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 6, 7:
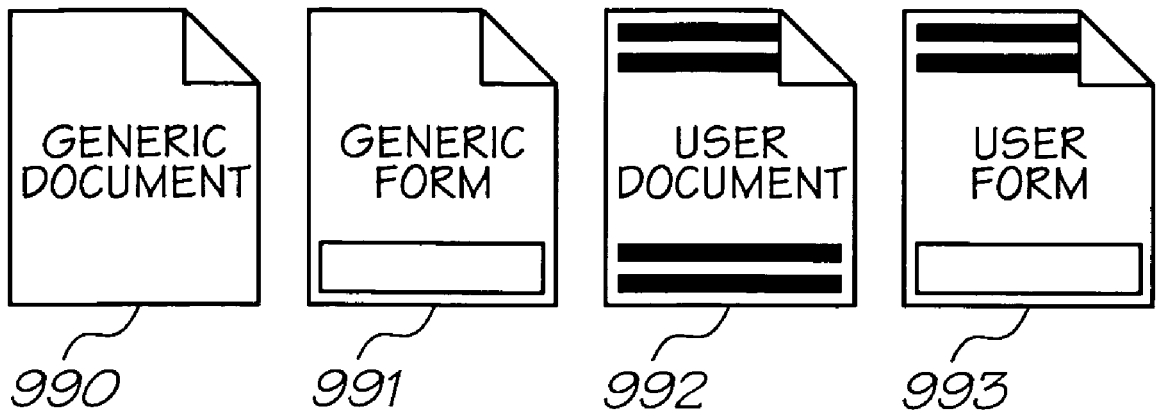
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Netpage Map Application

A map can be printed as a netpage, which a user can then interact with via the netpage pen. The user can request information about geographical features, cities, countries and so on. The user can also request more detailed maps of a specified area, the distance between two locations and many other items. The netpage printer responds to each request with the information printed on a subsequent netpage. In the case of maps, successively more detailed maps can be requested, culminating in street maps where available. Many different map views are possible, showing features which include, but are not limited to topography, vegetation, annual rainfall, seasonal temperature, population and malaria incidence. Multiple map views can also be combined to form a composite map.

The user can select a number of points on a map simply by clicking on them in succession with the netpage pen. The user can also select a geographic region by circumscribing it with the netpage pen.

The surface of a globe (i.e. a sphere representing the earth) can also be printed as a netpage. Ideally the globe rolls freely on its base, rather than rotating on an axis, so that any area on its surface can be rotated into view. A cupped base may be inset with ball bearings, for example. A user can select points or regions on the globe in the same way as on a planar map. Subsequent operations, typically invoked by pressing netpage buttons, act on the selected points or the selected region. The buttons can be printed on any map application page, or may be printed on the base of the globe or on a handy command card. Different command cards can be provided for users of different sophistication, e.g. children and adults.

The globe can provide audio output as an alternative to printed output. This may be particularly appropriate for interactive guessing games. The globe can ask the user to select the country which has a certain set of attributes or contains a certain geographic feature, and can rate the choice or give a hint once the user makes a choice. Guessing games can in general involve any number of players, or just one player and the globe. These types of games could be played on a map or a globe.

Our earlier application U.S. Ser. No. 09/575,129 describes in detail the tagging of the surface of a sphere.

Map Object Model

The Map object model revolves around a map provider, maps and location information. A map provider 500 has a unique identifier 803 and name and a number of map users 501. Each map user 501 has an alias identifier 65 unique within the scope of the map provider. Each map user 501 represents a particular netpage user 800 to the provider 500. A netpage user 800, on the other hand, can be a map user 501 of any number of providers.

The netpage registration server 11 maintains a "clipboard" for each netpage user 800 and for each netpage printer 601.

Figure 10:
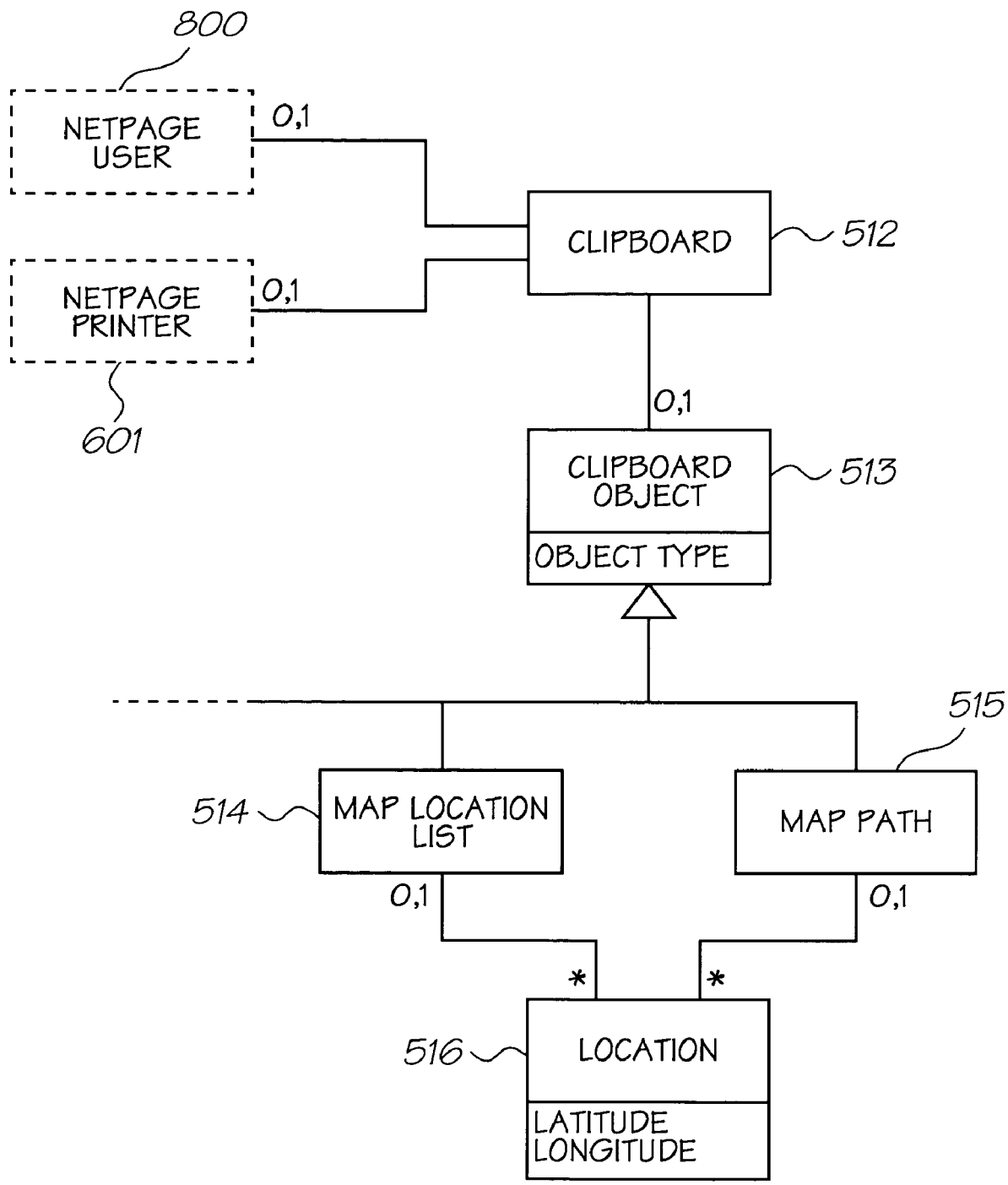
FIG. 10 is a schematic view of a clipboard class diagram.

The clipboard 512 provides a standard mechanism for one application to share data with another application, without the two applications having any knowledge of each other. The clipboard 512 typically holds a single data object at a time. Each clipboard object 513 has a type. The map application stores map location list objects 514 and map path objects 515 on the clipboard 512. A map location list 514 and a map path 515 both consist of lists of geographic locations 516, each defined by a latitude and a longitude. The Clipboard class diagram is shown in FIG. 10.

Figure 8:
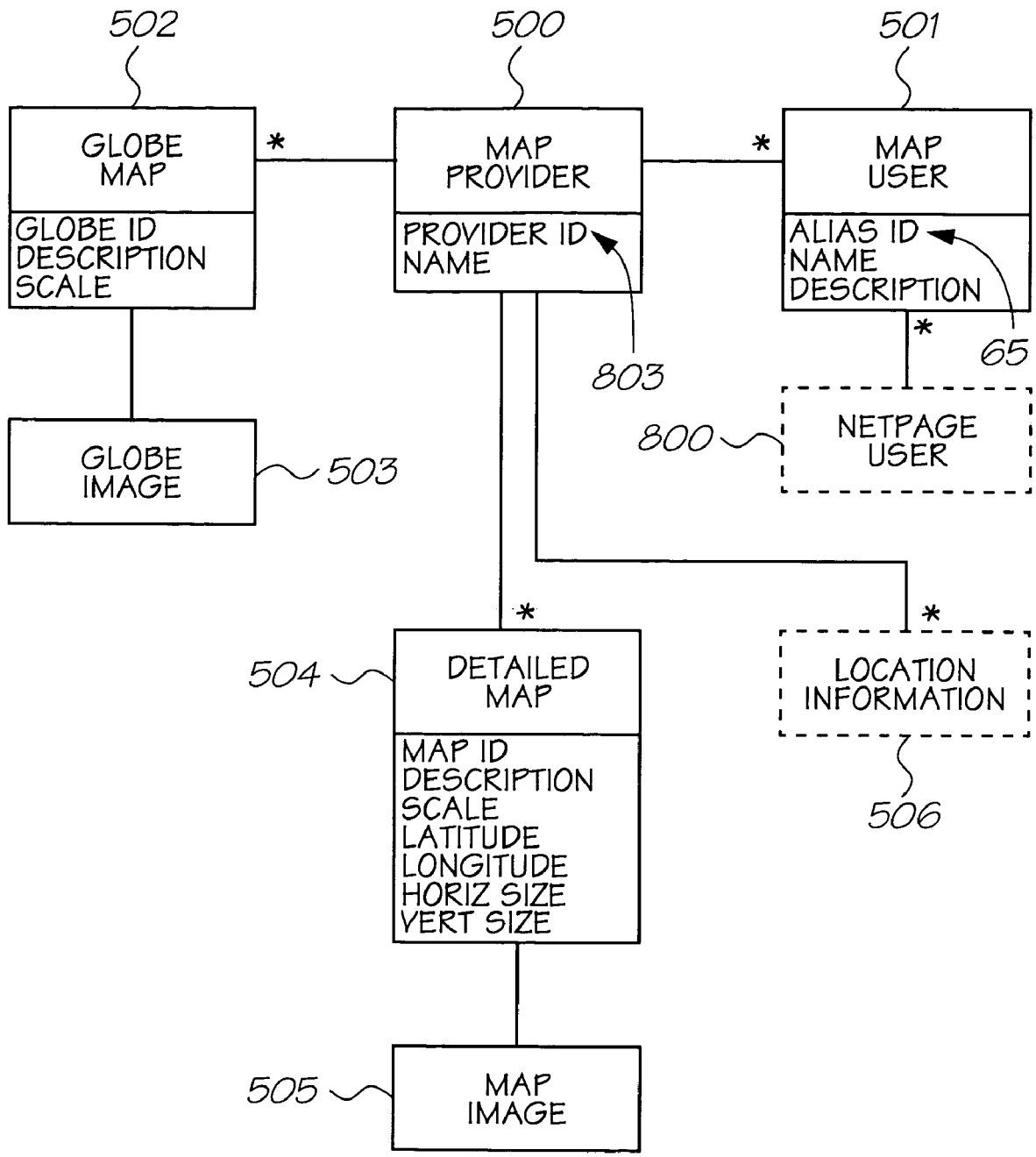
FIG. 8 is a schematic view of a map class diagram.

A map provider 500 can have a number of globe maps 502, each with a unique identifier, a description, and scale of the globe. A map provider also has a number of detailed maps 504. Each detailed map 504 has a unique map identifier, a description, a scale, the latitude and longitude of the top left corner of the map, a horizontal and vertical size, and a map image. The Map class diagram is shown in FIG. 8.

Figure 9:
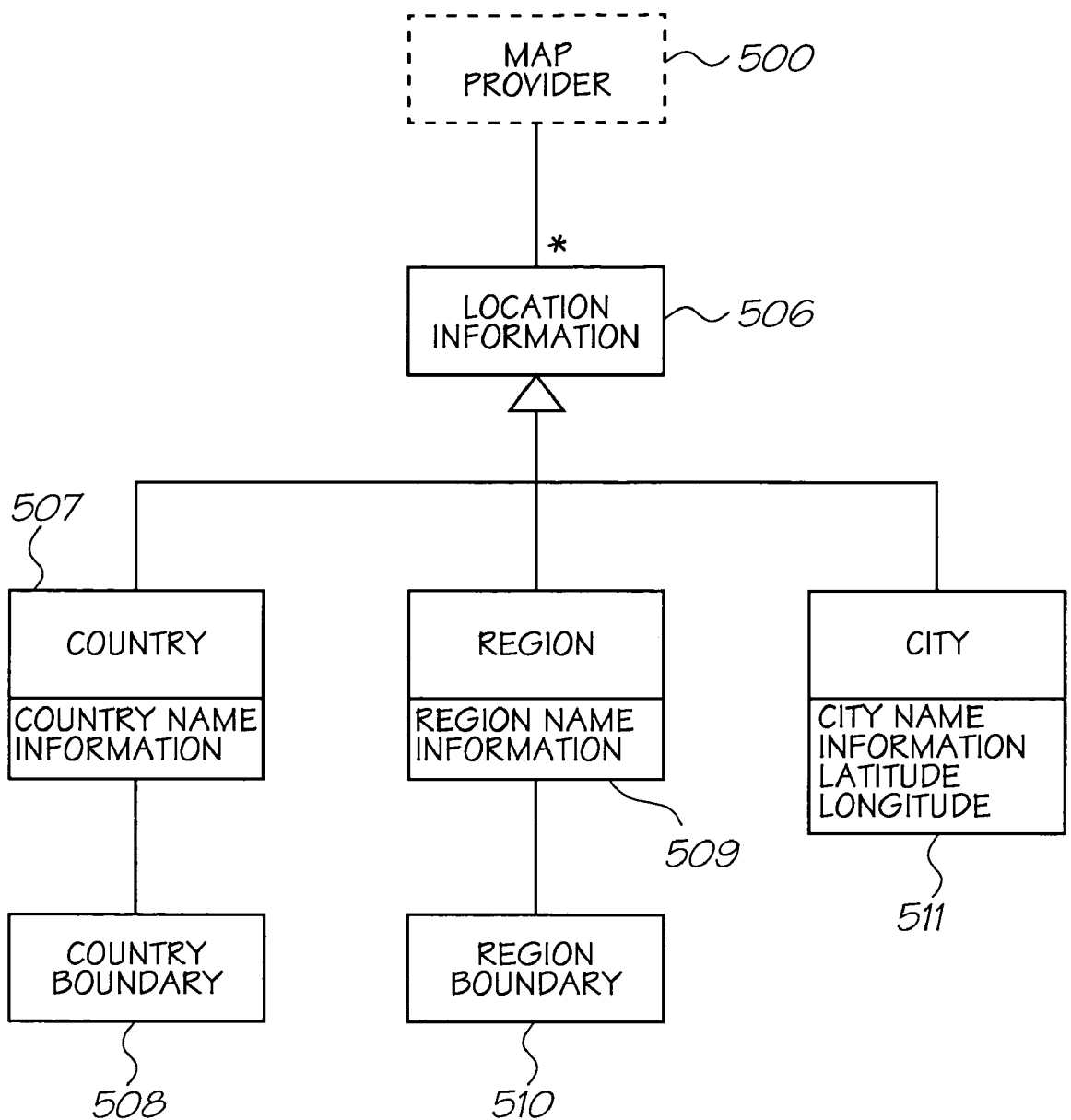
FIG. 9 is a schematic view of a location information class diagram.

A map provider has a database of location information 506 for various geographical locations and features on a map. As a minimum, the map provider has location information for countries 507, regions 509, and cities 511. Country information 507 contains the country name, information, and the country boundary 508. Region information 509 contains the region name, information, and region boundary 510. City information 511 contains the city name, information, latitude, and longitude. The Location Information class diagram is shown in FIG. 9.

Figure 11:
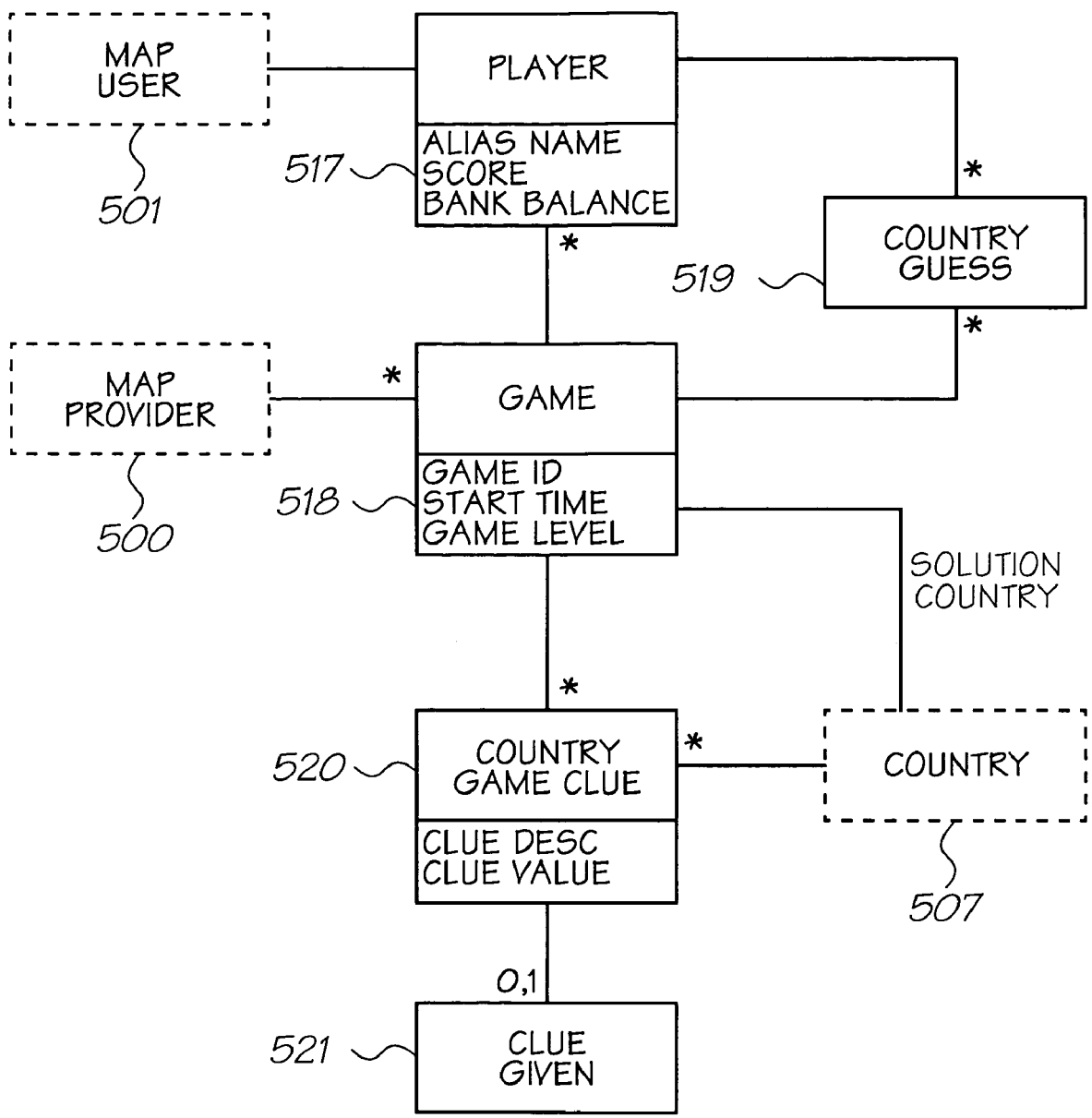
FIG. 11 is a schematic view of a guessing game class diagram.

As part of the map application the map provider may provide games. An example is a guessing game where one or more players can "purchase" clues and must guess the solution country. The Guessing Game class diagram is shown in FIG. 11. Each game has one or more players 517, each player 517 being a map user 501. A player 517 has an alias name, a current score and a bank balance with which to purchase clues. Each game 518 has a unique identifier, a start time and a game level (novice, competent, or expert). There is one solution country 507 for each game, and a number of clues 520 relating to that country. Each clue 520 has a description, a value (the price to buy the clue), and a status indicating whether the clue has been given 521 during the game. Each guess 519 made during the game is recorded for each player so the player is not penalized for making the same guess twice.

Map Application User Interface

Figure 12:
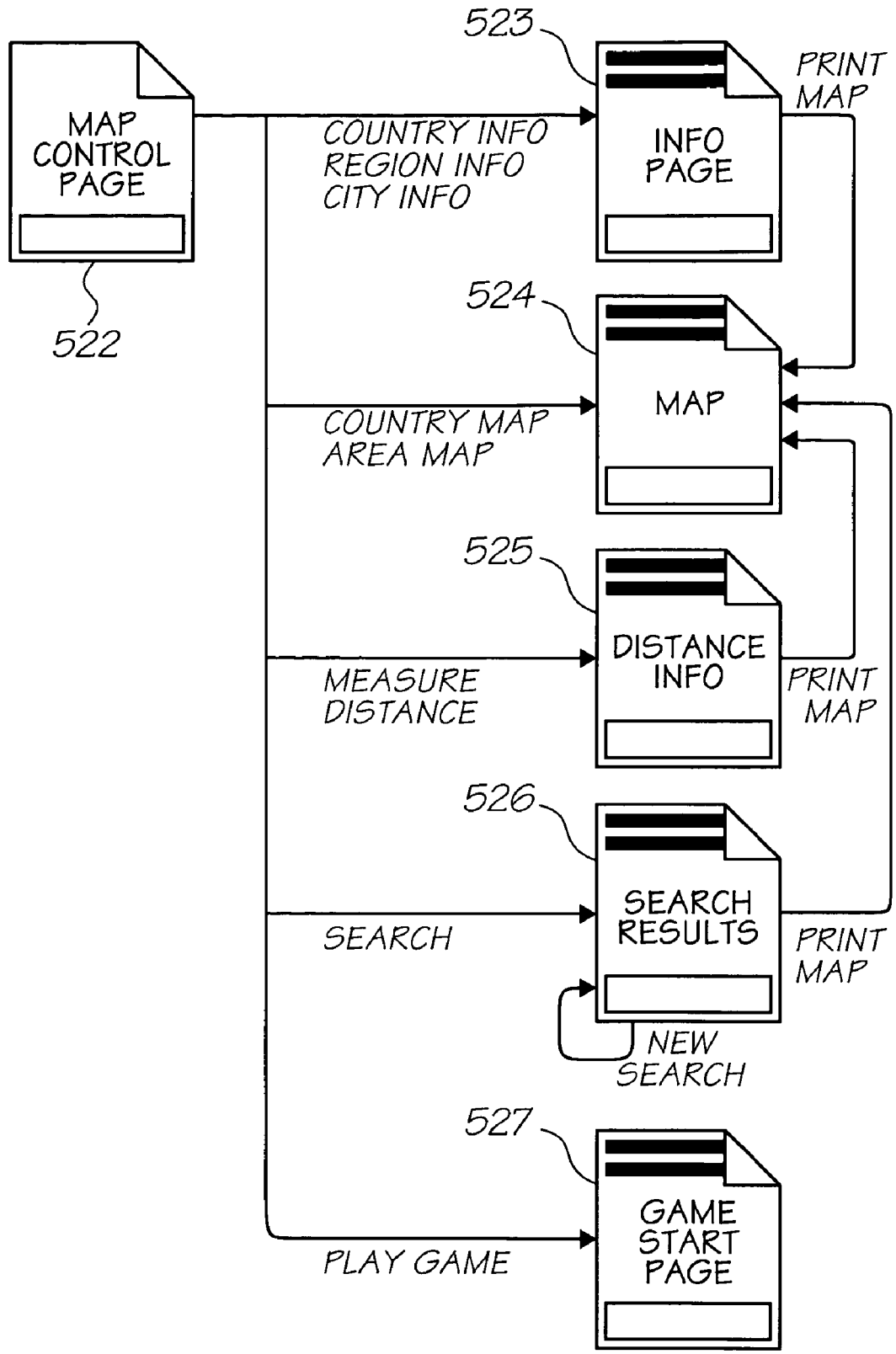
FIG. 12 is a schematic view of a schematic view of a map control user interface flow.

The user may obtain the Map Control page from a variety of links including:

the netpage directory (i.e. via the printer's help menu)
the netpage user's own bookmark
a button on the map
a button on the base of the globe The Map Control user interface flow is shown in FIG. 12.

Map Control Page

Figure 13:
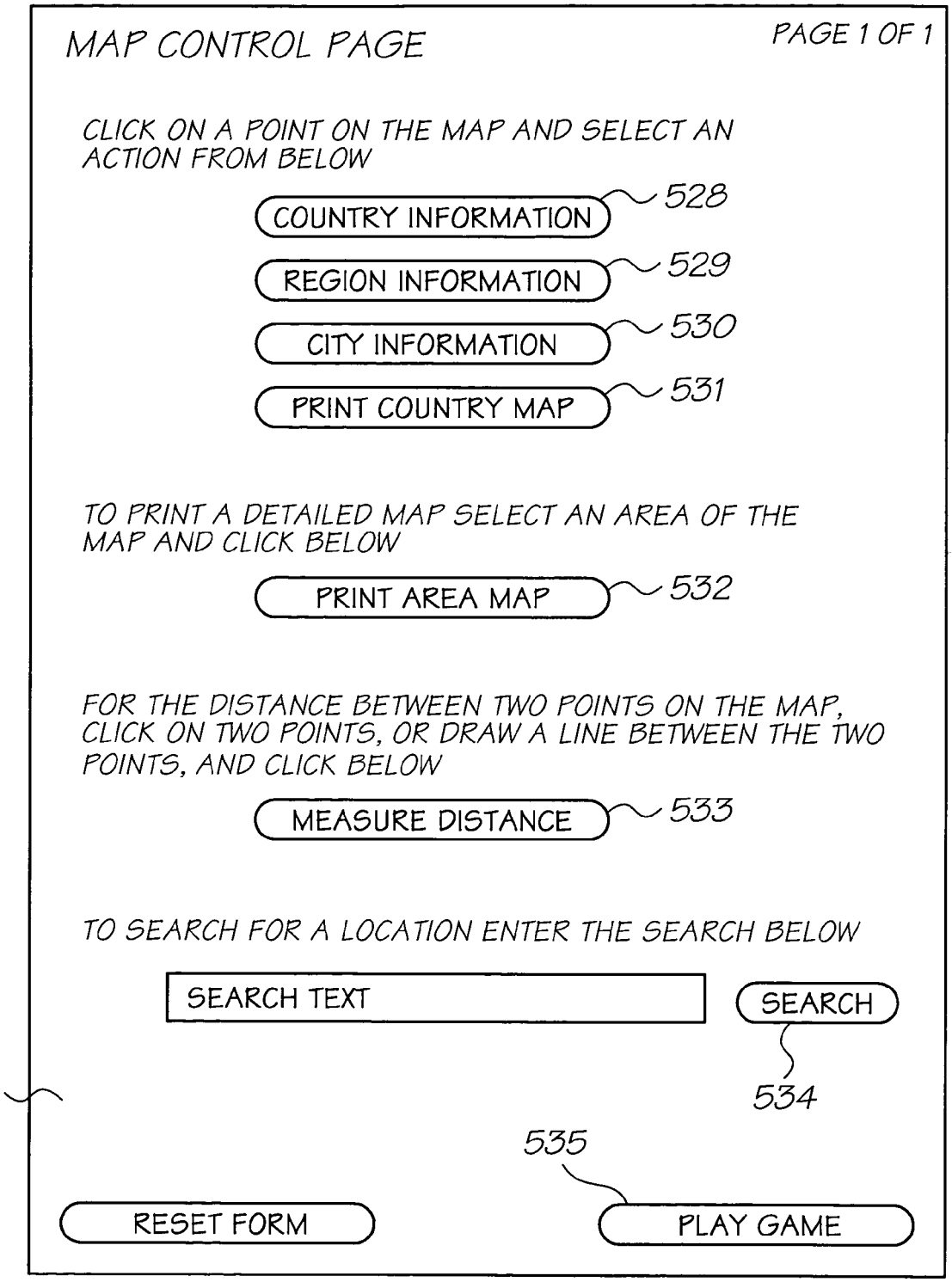
FIG. 13 is a schematic view of a map control page.

The netpage map (or globe) and the Map Control page 522 act as the user interface for the map application. The user selects a point on the map by clicking on it with the netpage pen. The user selects a geographic region by circumscribing it with the pen. Subsequent operations, invoked by pressing buttons printed on the control page, act on the selected points or the selected region. The Map Control page 522 is shown in FIG. 13. If the user selects a point on the map and clicks the <Country Information> button 528, a page of basic information 523 about the selected country is printed, as shown in FIG. 14. If the user selects a point on the map and clicks the <Region Information> button 529, a page of basic information 523 about the selected region is printed. If several regions in the application database contain the selected point, a list of regions is printed. The user then selects the desired region and an information page 523 is printed.

If the user selects a point on the map and clicks the <City Information> button 530, a page of basic information about the selected city is printed. If it is unclear which city the user requires from the point clicked, a list of cities close to the selected point is printed. The user then selects the required city and an information page is printed. If the user clicks the <Print Map> button on the information page 523, a map 524 of the current area is printed. Optionally, an information page may contain more buttons to provide more detailed information on the selected area.

If the user draws a line between two points on the map, or clicks on two map points in succession, then clicks the <Measure Distance> button 533 on the Map Control page the application calculates the distance between the two points and prints a Distance Information page 525. If the user draws a line between two points on a globe, the distance along a great circle arc between the two points is measured.

The user can search for a location or geographical feature by entering the search text in the search field on the Map Control page and clicking the <Search> button 534. The search text is converted to text using handwriting recognition. A search results page 526 is printed listing the feature name, country, latitude, and longitude of all matches found by the application. Optionally, the application allows the user to print a map of the desired area from the search results page.

The map or globe is implemented as a drawing field with the "submit delta" set on. Each time the user clicks on a point or draws a stroke the input is sent to the application. The latitude and longitude of each point in the stroke is determined via the map's tag map. The latitude and longitude of each city known to the application is recorded in its geographic database. If the user selects <City Information> the application determines which city or cities lie near the designated point.

Country and region borders are stored in the application's database as polygons, using a latitude- and longitude-based coordinate system. The application uses common computational geometry techniques to determine which boundary polygon a point lies within. If the user selects <Country Information> or <Print Country Map> the application determines which country boundary the selected point lies within. If the user selects <Region Information> the application determines which region boundary (or boundaries) the selected point lies within.

Area Maps

Figure 15:
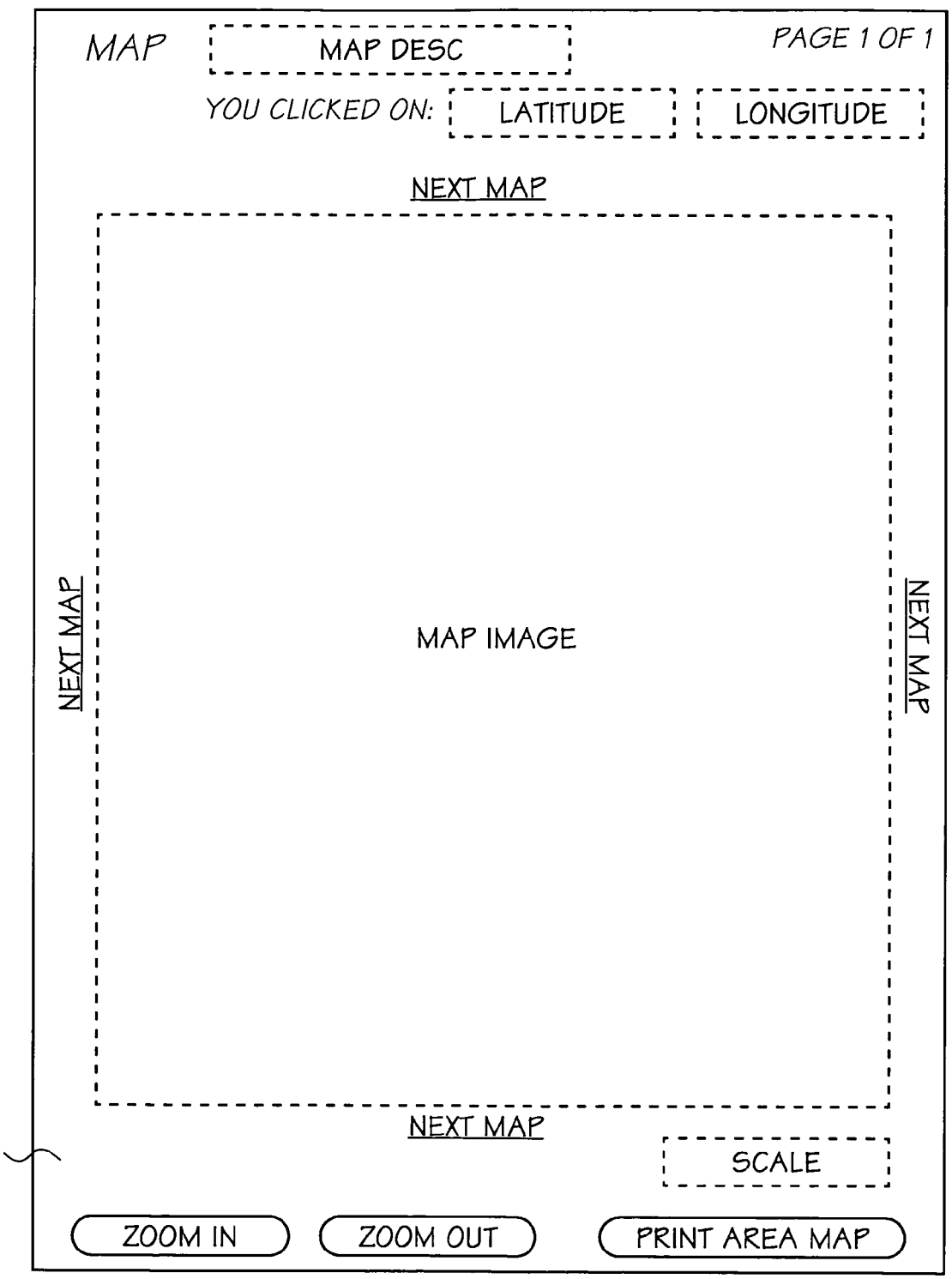
FIG. 15 is a schematic view of a map page.

If the user selects a point on a map or globe and clicks the <Print Country Map> button, a map 524 of the selected country is printed. The user may also print a map 524 of the selected location (country, region, or city) by clicking the <Print Map> button on the Information page, as shown in FIG. 14. To print a map of a specific area, the user selects the area by circumscribing it with the pen and clicking <Print Area Map> 532. The map provider may have many maps covering a particular area at several scales. The application determines which of its detailed maps fully enclose the selected area. The smallest scale map (i.e. the map with the most detail) which fully encloses the selected area is printed. An example map page is shown in FIG. 15.

The printed map page 524 shows the map description, the latitude and longitude of the point clicked (not shown for an area map), the map image, and the scale of the map. Optionally each map may have a legend printed either on the bottom of the map page, or on the back of the page. The user can print adjoining maps by clicking on a <Next Map> button at any map edge.

The user can zoom in to a particular area of the current map by clicking on a point of the map and clicking <Zoom In>. A new map 524 is printed, centered on the point selected, in the next smaller scale available. The user can zoom out from this map by clicking <Zoom Out>. A new map is printed in the next larger scale available, centered on the current map. The user can zoom in to a particular area of the current map by circumscribing an area with the pen and clicking <Print Area Map>. The application's most detailed map of the circumscribed area is printed.

Guessing Game

A user can play geographical guessing games using a globe (or a map) and a game control page. The user starts a game by clicking the <Play Game> button 535 on the Map Control page and a Game Start page 527 is printed which shows the game identifier and a list of players. The players are identified by their netpage pens and a new player can join the game by entering a player alias (optional) and clicking the <New Player> button. An updated Game Start page 527 is then printed. Optionally, players who are not in the same location can specify the game identifier of the game to which they wish to join. When all players have joined the game, the player will select the desired game level and press the <Start Game> button.

A Game Control page is then printed which contains <Buy Clue> buttons (one for each value of clue), a list of the players and their current score, a list of all clues given in the game so far, and a list of all guesses made so far. Each player can purchase a clue by clicking on the appropriate <Buy Clue> button when it is their turn to guess the country. A clue sheet is printed for the current player which shows the new clue, all clues given in the game so far, and all guesses made so far. The current player then submits a guess by clicking on the country on the globe which they think is the solution. After each guess an updated game control sheet is printed. Alternatively, audio output, utilizing a synthesized or sampled and sequenced voice, can be used to provide feedback in place of printed pages. The game continues, permitting each player to purchase a clue and submit a guess in turn, until a player submits a guess, or until all players' bank balance is zero.

Map Location Selection

User-selected locations on a map or globe are stored by the map application on the user's clipboard. The user's clipboard 512 is stored on the registration server 11, referenced by the user's netpage user id 60. Any application can store objects on and retrieve objects from a user's clipboard using the user's alias id 65. The registration server determines the user's netpage user id 60 from the alias id 65 and application id 803. To store an object in the user's clipboard the application must specify the object type and object value. An application can query the type of object the clipboard contains to determine whether the clipboard content is useful to the application.

The user's clipboard may have been overwritten by another application if the user has used another netpage application since selecting a map point or region. In this case the clipboard's object type is incompatible with the map application and an error is returned to the user.

If the user clicks on a point on a map the application stores this point as a latitude-longitude position in the user's clipboard, with an object of type "MapLocationList". If the clipboard already contains a "MapLocationList" object, the application appends the latitude-longitude position to the list of map locations already contained in the list, and the object is re-written to the user's clipboard.

If the user draws a path or circumscribes a region on a map, the path is stored in the user's clipboard with an object of type "MapPath". The path is stored as a list of map locations making up the path, specified in latitude-longitude coordinates.

The application also receives netpage pen clicks or pen strokes from the page server in object-relative coordinates. A map is implemented as a netpage drawing field, and a position returned from the page server is relative to the top left corner of the drawing field. The application translates each page coordinate to a latitude-longitude coordinate pair using the relevant map scale and the latitude-longitude of the map's top left corner. In the case of a globe, the latitude-longitude coordinates of each globe location are encoded in the globe surface tag map and a position passed to the application by the page server will be a latitude-longitude coordinate pair.

When the user presses a map application button, the application can retrieve the user's clipboard object type. and determines how to use the clipboard contents in the context of the button pressed by the user. For example, if the user clicks on a button which acts on a single map location (such as <Country Information>), only the last location in the map location list is used.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method for performing games based on a game participant's positioning of an optically imaging pen on a surface, said method comprising:
    detecting positioning of said pen on the surface, said surface being on a pre-printed gaming form with game-related graphics and a position-coding pattern printed thereon, by optically imaging the position-coding pattern printed on said surface with said pen as said game participant positions said pen on said surface, wherein said position-coding pattern codes coordinate information and is spatially interrelated with said game-related graphics;
    converting the information detected by the pen into transmittable data; and
    transmitting the data via a communication system to a recipient.

2. A method for performing games as claimed in claim 1, wherein the pen detects its position on the surface and leaves written information, which is legible to a participant's eye, on the surface.

3. A method for performing games as claimed in claim 1, wherein feedback on the transmitted data is received from the recipient via the communication system.

4. A method for performing games as claimed in claim 1, wherein the game is performed as a party game or amusement game against one or more opponents and/or software.

5. A method for performing games as claimed in claim 1, wherein the pen transmits the data continually to the communication system without intermediate storage.

6. A method for performing games as claimed in claim 1, wherein the pen transmits a unique identifier which is utilized by the recipient for identifying the participant and/or the pen.

7. A method for performing games as claimed in claim 1, wherein said recipient derives position-related data from the transmitted data, said position-related data being recorded in said reading of the position-coding pattern by the pen.

8. A method for performing games as claimed in claim 1, wherein the pen transmits the data to a local receiving unit.

\* \* \* \* \*